Figure 1:
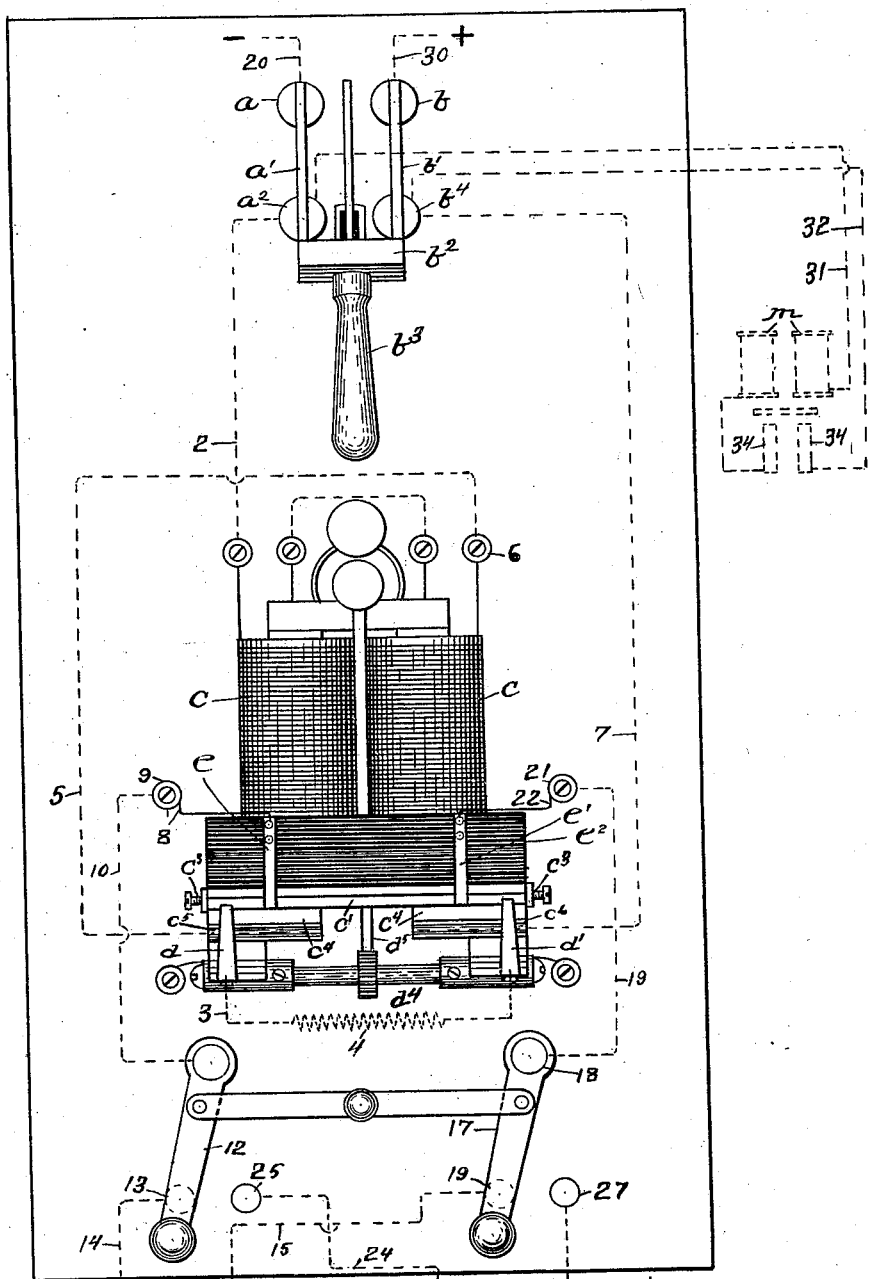

No. 689,930. Patented Dec. 31, 1901.
N. H. SUREN.
APPARATUS FOR CONTROLLING THE CONNECTION OF STORAGE BATTERIES WITH CHARGING CIRCUITS.
(Application filed June 29, 1899.)
(No Model.) 3 Sheets—Sheet 1.

No. 689,930. Patented Dec. 31, 1901.
N. H. SUREN.
APPARATUS FOR CONTROLLING THE CONNECTION OF STORAGE BATTERIES WITH CHARGING CIRCUITS.
(Application filed June 29, 1899.)
(No Model.) 3 Sheets—Sheet 2.
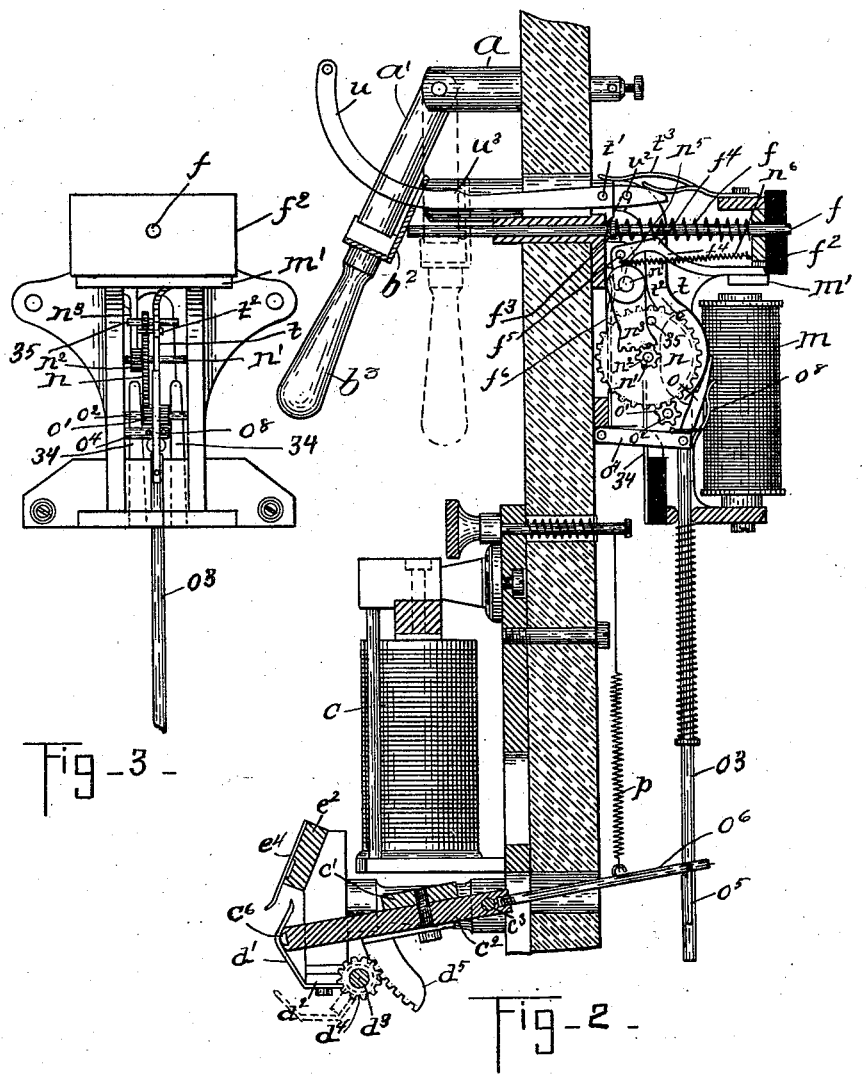
Fig-3-
Fig-2-
Witnesses:
H. B. Davis.
J. L. Hutchinson
Inventor
Nathan H. Suren
by B. J. Noyes
Atty No. 689,930. Patented Dec. 31, 1901.
N. H. SUREN.
APPARATUS FOR CONTROLLING THE CONNECTION OF STORAGE BATTERIES WITH CHARGING CIRCUITS.
(Application filed June 29, 1899.)
(No Model.) 3 Sheets—Sheet 3.
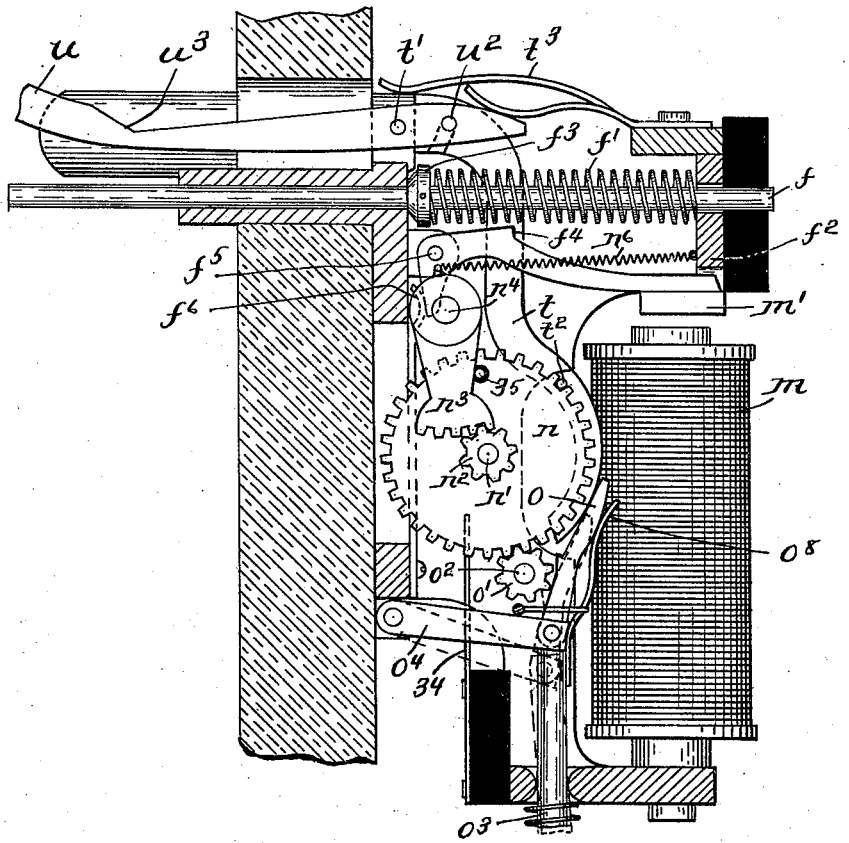
Fig-4-

UNITED STATES PATENT OFFICE.

NATHAN H. SUREN, OF NEEDHAM, MASSACHUSETTS, ASSIGNOR TO GAMEWELL FIRE ALARM TELEGRAPH COMPANY, OF NEW YORK, N. Y., A CORPORATION OF NEW YORK.

APPARATUS FOR CONTROLLING THE CONNECTION OF STORAGE BATTERIES WITH CHARGING-CIRCUITS.

SPECIFICATION forming part of Letters Patent No. 689,930, dated December 31, 1901.

Application filed June 29, 1899. Serial No. 722,286. (No model.)

*To all whom it may concern:*

Be it known that I, NATHAN H. SUREN, of Needham, county of Norfolk, and State of Massachusetts, have invented an Improvement in Apparatus for Controlling the Connection of a Storage Battery with a Charging-Circuit, of which the following description, in connection with the accompanying drawings, is a specification, like characters on the drawings representing like parts.

At the present time it is customary in many places to use storage batteries for fire-alarm and police-signal systems, and such storage batteries are charged at the proper times by a current from a suitable charging-circuit.

In practice it sometimes happens that the charging-current is too weak to properly charge the storage battery, or the counter electromotive force of the storage battery is proportionately too high, or the storage-battery circuit is open by reason of a loose connection or some other cause, and serious results are liable to follow any of the above-mentioned troubles.

This invention has for its object to provide means whereby in case any of the above-mentioned troubles should exist when the storage battery is connected with the charging-circuit or should occur during the time that the storage battery is thus connected the said storage battery will be automatically disconnected from the charging-circuit in order that any serious results may be obviated.

Figure 1 shows in front elevation a device embodying this invention for automatically controlling the connection of a storage battery with a charging-circuit, the circuit-wires being shown in dotted lines. Fig. 2 is a vertical section of the device shown in Fig. 1. Fig. 3 is a rear side view of a portion of the apparatus shown in Fig. 1, and Fig. 4 is an enlarged detail of some of the mechanism to be described.

$a\ b$ represent the posts to which the switch-arms $a'\ b'$ are pivoted, and said switch-arms are connected together by an insulating bridge-piece $b^2$, having secured to it a handpiece $b^3$, by which the said switch-arms are operated. The switch-arms are adapted to be moved into and out of engagement with the split ends of the posts $a^2\ b^4$. A double-pole knife-switch is thus provided. The charging-circuit wires 20 30 are connected to said posts $a\ b$.

The knife-switch is adapted to be closed by hand and to be opened either by hand or automatically, the latter in case any of the troubles heretofore referred to should exist or should occur.

$c$ represents an electromagnet which may be called a "cut-out" magnet, and the coils of said magnet are connected in series in a wire 2, connected to the post $a^2$. The armature $c'$ of the electromagnet $c$ is secured to a plate $c^2$, pivoted at $c^3$ to the frame, and said plate $c^2$, bearing said armature $c'$, has projecting from it two portions $c^4\ c^4$, of insulating material, and along the front edge of each portion a metallic strip $c^5\ c^6$ is secured.

$d\ d'$ represent a pair of contact-springs secured to a plate $d^2$, which projects from and is secured to a rock-shaft $d^3$, having its bearings in the frame, and said rock-shaft has secured to it a pinion $d^4$, which is engaged by a toothed sector $d^5$, secured to and depending from the plate $c^2$, bearing the armature. As the armature vibrates the shaft $d^3$ will be rocked and the contact-springs $d\ d'$ moved by it. When said contact-springs $d\ d'$ are in their upright positions, they will occupy a proper position to engage the metallic strips $c^5\ c^6$ on the plate $c^2$, providing the armature is in its retracted position; but if the armature is attracted then the said contact-springs $d\ d'$ will be moved outward at the same time that the armature is attracted. By providing the rock-shaft for moving the contact-springs it will be seen that they may be moved a long distance, so as to insure effectively breaking any arc which might be produced. The contact-springs $d\ d'$ are connected by a wire 3, which includes a suitable resistance 4. One of the metallic strips, as $c^5$, is connected by a wire 5 with one of the binding-posts 6 of the electromagnet $c$, and the other metallic strip, as $c^6$, is connected by a wire 7 with the split post $b^4$ of the automatic switch. The wire 3, it will be seen, forms a loop-circuit which is connected with the contact-springs $d$ $d'$, said springs forming the terminals thereof.

With the parts thus far described it will be seen that if the automatic switch is closed, as represented by dotted lines, Fig. 2, the current from the charging-line will pass from wire 20 through switch-arm $a'$, post $a^2$, wire 2, electromagnet $c$, post 6, wire 5, metallic strip $c^5$, contact-spring $d$, loop-circuit 3, resistance 4, contact-spring $d'$, metallic strip $c^6$, wire 7, post $b^4$, switch-arm $b'$, post $b$ to wire 30, the circuit thus described leading from the charging-circuit 20 30 and including the cut-out magnet $c$ and switches $c^5$ $d$ and $c^6$ $d'$, and the loop-circuit 3 serves as and constitutes the cut-out-magnet circuit, and said circuit is closed by said switches whenever the armature of said cut-out magnet is in its retracted position; but whenever the automatic switch is thus closed and the cut-out-magnet circuit thus connected with the charging-circuit 20 30 the electromagnet $c$ will be included in the circuit thus established, and its armature $c'$ will be at once attracted, thereby opening said cut-out-magnet circuit by disconnecting said loop-circuit 3.

$e$ $e'$ represent a pair of contact-springs secured to an insulating-plate $e^2$, and one of said contact-springs, as $e$, is connected by a wire 8 with a binding-post 9, and the wire 10 connects said binding-post 9 with a switch-arm 12, which may be the arm of an ordinary two-point switch, and the contact-point 13 of said switch will be connected by a wire 14 with one side of the storage battery A, and a wire 15 will connect the other side of said battery A with a contact-point 16 of another two-point switch, the switch-arm 17 of which is pivoted at 18, and the wire 19 connects said switch-arm 17 with the binding-post 21, which is connected by a wire 22 with the contact-spring $e'$. The contact-springs $e$ $e'$ are disposed in the path of movement of the metallic strips $c^5$ $c^6$, so as to be engaged, respectively, by said metallic strips whenever the armature of the electromagnet $c$ is attracted. Thus it will be seen that whenever the armature $c'$ of said electromagnet $c$ is attracted and the metallic strips $c^5$ $c^6$ brought into engagement with the contact-springs $e$ $e'$ the storage battery A will be connected with the charging-circuit. The wire 24 connects the open contact 25 with one side of a storage battery B, and a wire 26 connects the other side of said battery with the open contact-point 27, so that whenever the two switch-arms 12 and 17 are moved onto the contact-points 25 27 the storage battery B will be connected with the charging-circuit and the storage battery A disconnected.

If the charging-current is sufficient to charge the storage battery, then the armature $c'$ will remain in its attracted position; but if it should be too weak or the counter electromotive force of the batteries should be proportionately too high or the battery-circuit should be open, owing to a loose connection or any other cause, then the said armature $c'$ will immediately fall away from the electromagnet $c$ and will again engage the contact-springs $d$ $d'$, closing the cut-out-magnet circuit, including the loop-circuit 3, which includes the electromagnet $c$, and a circuit being thus again established, including the said electromagnet $c$, its armature $c'$ will be again attracted, thereby again connecting the storage battery with the charging-circuit, and as a result the said armature $c'$ will be repeatedly vibrated. If this vibration continues for any length of time, the connections, &c., will be burned and serious injury will result to many of the parts, and consequently means are provided for automatically yet positively moving the knife-switch $a'$ $b'$ to open the circuit, and thereby disconnect the storage battery and also the cut-out magnet $c$ from the charging-circuit. The means herein provided for accomplishing this result utilizes this vibratory action of the armature $c'$, and said means will now be described.

$f$ represents a plunger rod or bar passing through the frame opposite the bridge or cross piece $b^2$ of the automatic switch, and said rod or bar is encircled by a spring $f'$, one end of which bears against a bracket $f^2$ and the other end against a projection $f^3$ on the rod or bar, and the tendency of said spring is to thrust the plunger rod or bar outward to in turn positively move the knife-switch outward, and thereby open it. The spring-pressed plunger rod or bar is thrust inward, compressing the spring $f'$, by means of the knife-switch, when the same is closed by hand. When said spring-pressed rod or bar is thrust inward, its projection $f^3$ will engage a detent $f^4$, pivoted at $f^5$ to the frame, said detent being held pressed up into correct position to engage the spring-pressed rod or bar by means of a flat spring $f^6$, bearing upon a projection on the detent. The detent $f^4$ has a rearwardly-extended arm to which is attached the armature $m'$ of an electromagnet $m$, and whenever said electromagnet $m$ is energized and its armature attracted the detent $f^4$ will be operated to release the spring-pressed plunger rod or bar. The electromagnet $m$ is connected by a wire 31 (see Fig. 1) with the post $a^2$ and by a wire 32 with the post $b^4$, and the circuit of said electromagnet is normally open and has a pair of contact-springs 34, which when closed will close the circuit in order that the electromagnet $m$ may be energized and its armature operated to release the spring-pressed plunger rod or bar. The pair of contact-springs 34 are closed by a pin 35, projecting in opposite ways from a toothed wheel $n$, but insulated from it, and said toothed wheel $n$ is secured to a shaft $n'$, to which the pinion $n^2$ is secured, and a toothed sector $n^3$ engages said pinion, and said toothed sector $n^3$ is pivoted at $n^4$ and has projecting from its hub a hook $n^5$, to which one end of a spring $n^6$ is attached, the other end of said spring being connected to the bracket $f^2$.

The tendency of the spring $n^6$ is to move the sector $n^3$ in the direction of the arrow thereon, and thereby turn the pinion $n^2$ and toothed wheel $n$ until the insulated pin 35 strikes against one side or edge of said sector, as represented in Fig. 2. The toothed wheel $n$ is turned in the opposite way by means of a pawl $o$, which intermittingly engages a pinion $o'$, secured to a shaft $o^2$ and held in engagement with the toothed wheel $n$, thereby moving said toothed wheel $n$ step by step as the pinion $o'$ is intermittingly engaged and operated, and when said toothed wheel $n$ has been moved a sufficient number of steps the pin 35, carried by it, will engage the contact-springs 34 and close the circuit of the electromagnet $m$, which serves as the tripper-magnet. The pawl $o$ is pivoted to the upper end of a rod or bar $o^3$, which is loosely connected at its upper end to a pivoted arm $o^4$ and has at its lower end a slot $o^5$, which receives a pin projecting from the rear end of a rod or bar $o^6$, projecting rearwardly from the armature-carrying plate $c^2$, so that as the armature vibrates its rearwardly-projecting rod or bar $o^6$ will intermittingly raise the rod or bar $o^3$ and cause the pawl $o$ to intermittingly engage the pinion $o'$, and thereby move the toothed wheel $n$ step by step. As the rod or bar $o^3$ is raised by the arm $o^6$ the pawl $o$ first engages the pinion $o'$ and turns it one step or tooth. Then an extension on said pawl engages the lower end of an arm $t$ and by said arm is moved laterally, so that said arm $t$ controls the position of the pawl $o$ relative to the pinion. $p$ represents the retractile spring of the armature $c'$, which is attached at its lower end to said rod or bar $o^6$. A flat spring $o^8$ is attached to the upper end of the rod or bar $o^3$, which bears upon the pawl. As a means of locking said toothed wheel $n$ as it is advanced step by step a detent-lever $t$ is provided, which is pivoted at $t'$, and it has a detent $t^2$, which enters any one of the notches of the wheel $n$, and said detent-lever is held pressed into engagement with said wheel $n$ by means of a spring $t^3$, and the detent $t^2$ is so shaped as to hold said toothed wheel at rest when in engagement therewith, yet to slip over the teeth when said wheel $n$ is moved. As the pawl $o$ operates the pinion $o'$ the toothed wheel $n$ is forced ahead step by step, and the spring-pressed detent-lever $t$ is thrust aside by the teeth of said wheel $n$ acting on the detent $t^2$. To restore the wheel $n$ to its normal position, as shown, the detent-lever $t$ is positively moved out of engagement with the wheel $n$, and the wheel when thus disengaged will be at once restored by the spring $n^6$. To positively move the spring-pressed detent-lever $t$, a lever $u$ is pivoted also at $t'$, and said lever passes through a slot in the plate and also through a slot in the cross-piece of the knife-switch, so as to be operated by said switch. The lever $u$ has at its rear end a pin $u^2$, which engages a slot in the detent-lever $t$, and when the front end of said lever $u$ is depressed it will act to positively move the detent-lever $t$ on its pivot and disengage it from the wheel $n$. The lever $u$ has formed on it a cam $u^3$, over which the cross-piece of the knife-switch passes as said switch is operated in either direction, and as it passes over said cam it depresses the front end of the lever $u$ and operates it.

I claim—

1. A charging-circuit, a cut-out-magnet circuit containing a cut-out magnet, a storage battery, a switch for connecting the charging-circuit with the cut-out-magnet circuit, a switch operated by the cut-out magnet for connecting the cut-out-magnet circuit with the storage battery, and means for opening the switch which connects the charging-circuit with the cut-out-magnet circuit operated by the retracted armature of said cut-out magnet, substantially as described.

2. A charging-circuit, a cut-out-magnet circuit containing a cut-out magnet, a storage battery, a switch for connecting the charging-circuit with the cut-out-magnet circuit, a switch operated by the cut-out magnet for connecting the cut-out-magnet circuit with the storage battery and for connecting the cut-out magnet therein in series with said storage battery, and means for opening the switch which connects the charging-circuit with the cut-out-magnet circuit operated by the retracted armature of said cut-out magnet, substantially as described.

3. A charging-circuit, a cut-out-magnet circuit containing a cut-out magnet, a switch operated by said magnet for closing said cut-out-magnet circuit, a storage battery, a switch for connecting the charging-circuit with the cut-out-magnet circuit, a switch operated by the cut-out magnet for connecting the cut-out-magnet circuit with the storage battery, and means for opening the switch which connects the charging-circuit with the cut-out-magnet circuit operated by the retracting armature of said cut-out magnet, substantially as described.

4. A charging-circuit, a cut-out-magnet circuit containing a cut-out magnet, a switch operated by said magnet for closing said cut-out-magnet circuit when said magnet is deënergized, a storage battery, a switch for connecting the charging-circuit with the cut-out-magnet circuit, a switch operated by the cut-out magnet when energized for connecting the cut-out-magnet circuit with the storage battery at which time said cut-out-magnet circuit is opened by the other switch, and means for opening the switch which connects the charging-circuit with the cut-out-magnet circuit operated by the retracting armature of said cut-out magnet, substantially as described.

5. A charging-circuit, a cut-out-magnet circuit containing a cut-out magnet, a storage battery, a switch for connecting the charging-circuit with said cut-out-magnet circuit having a handpiece for closing it, a switch operated by the cut-out magnet for connecting the cut-out-magnet circuit with the storage battery and automatic means for opening the switch which connects the charging-circuit with the cut-out-magnet circuit operated by the retracting armature of said cut-out magnet, substantially as described.

6. A charging-circuit, a cut-out-magnet circuit containing a cut-out magnet, a storage battery, a switch for connecting the charging-circuit with said cut-out-magnet circuit, an actuator for opening said switch, a locking device for locking said actuator, a switch operated by the cut-out magnet for connecting the cut-out-magnet circuit with the storage battery, and means for releasing said locking device, operated by the retracting armature of said cut-out magnet, substantially as described.

7. A charging-circuit, a cut-out-magnet circuit containing a cut-out magnet, a storage battery, a switch for connecting the charging-circuit with said cut-out-magnet circuit, a spring-pressed actuator for opening said switch, a detent for said actuator into engagement with which said actuator is moved when said switch is closed, a switch operated by the cut-out magnet for connecting the cut-out-magnet circuit with the storage battery, and means for moving said detent to release said actuator operated by the retracting armature of said cut-out magnet, substantially as described.

8. A charging-circuit, a cut-out-magnet circuit containing a cut-out magnet, a storage battery, a switch for connecting the charging-circuit with said cut-out-magnet circuit, an actuator for opening said switch, a locking device for locking said actuator, a switch operated by the cut-out magnet for connecting the cut-out-magnet circuit with the storage battery, and an electromagnet for releasing said locking device, the circuit of which is operated by the retracting armature of said cut-out magnet, substantially as described.

9. A charging-circuit, a cut-out-magnet circuit containing a cut-out magnet, a storage battery, a switch for connecting the charging-circuit with said cut-out-magnet circuit, an actuator for opening said switch, a locking device for locking said actuator, a switch operated by the cut-out magnet for connecting the cut-out-magnet circuit with the storage battery, and an electromagnet for releasing said locking device, and a step-by-step actuating device for the circuit of said releasing-electromagnet operated by the retracting armature of said cut-out magnet, substantially as described.

10. A charging-circuit, a cut-out-magnet circuit containing a cut-out magnet, a storage battery, a switch for connecting the charging-circuit with said cut-out-magnet circuit, a spring-pressed actuator for opening said switch, a detent for said actuator into engagement with which said actuator is moved when said switch is closed, a switch operated by the cut-out magnet for connecting the cut-out-magnet circuit with the storage battery, an electromagnet for moving said detent, the circuit of which is operated by the retracting armature of said cut-out magnet, substantially as described.

11. A charging-circuit, a cut-out-magnet circuit containing a cut-out magnet, a storage battery, a switch for connecting the charging-circuit with said cut-out-magnet circuit, a spring-pressed actuator for opening said switch, a detent for said actuator into engagement with which said actuator is moved when said switch is closed, a switch operated by the cut-out magnet for connecting the cut-out-magnet circuit with the storage battery, an electromagnet for moving said detent, a step-by-step actuating device for the circuit of said electromagnet operated by the retracting armature of said cut-out magnet, substantially as described.

12. An electromagnet, its pivoted armature, a toothed sector and one or more contacts borne by said armature, a rock-shaft bearing one or more contacts and a pinion secured to it which is engaged and operated by said toothed sector, substantially as described.

In testimony whereof I have signed my name to this specification in the presence of two subscribing witnesses.

NATHAN H. SUREN.

Witnesses:
B. J. NOYES,
JENNIE L. HUTCHINSON.